(12) United States Patent
Shao et al.

(10) Patent No.: US 11,449,964 B2
(45) Date of Patent: Sep. 20, 2022

(54) IMAGE RECONSTRUCTION METHOD, DEVICE AND MICROSCOPIC IMAGING DEVICE

(71) Applicant: SUZHOU MICROVIEW MEDICAL TECHNOLOGIES CO., LTD., Suzhou (CN)

(72) Inventors: Jinhua Shao, Suzhou (CN); Jin Sun, Suzhou (CN); Houli Duan, Suzhou (CN); Qiang Wang, Suzhou (CN)

(73) Assignee: SUZHOU MICROVIEW MEDICAL TECHNOLOGIES CO., LTD., Suzhou (CN)

( * ) Notice: Subject to any disclaimer, the term of this patent is extended or adjusted under 35 U.S.C. 154(b) by 279 days.

(21) Appl. No.: 16/850,077

(22) Filed: Apr. 16, 2020

(65) Prior Publication Data
US 2020/0242732 A1 Jul. 30, 2020

Related U.S. Application Data

(63) Continuation of application No. PCT/CN2018/108865, filed on Sep. 29, 2018.

(30) Foreign Application Priority Data

Oct. 16, 2017 (CN) .......................... 201710959434.8

(51) Int. Cl.
*G06K 9/00* (2022.01)
*G06T 3/40* (2006.01)
(Continued)

(52) U.S. Cl.
CPC ....... *G06T 3/4007* (2013.01); *G01N 21/6486* (2013.01); *G02B 21/082* (2013.01);
(Continued)

(58) Field of Classification Search
CPC .............. A61B 1/00172; A61B 5/0059; A61B 1/00165; A61B 5/0071; A61B 1/07;
(Continued)

(56) References Cited

U.S. PATENT DOCUMENTS 5,257,100 A * 10/1993 Hattori ............... G02B 23/2484
600/109
5,436,980 A * 7/1995 Weeks ...................... G06T 7/12
382/141
(Continued)

FOREIGN PATENT DOCUMENTS

CN 100481937 C 4/2009
CN 104794475 A 7/2015
(Continued)

OTHER PUBLICATIONS

The second Office Action of parallel AU application No. 2018352821.
(Continued)

*Primary Examiner* — Alex Kok S Liew
(74) *Attorney, Agent, or Firm* — J.C. Patents

(57) ABSTRACT

Provided are an image reconstruction method, a device and a microscopic imaging device. The method includes calculating a gray value at each fiber center in a fiber bundle (04) in a reconstructed image according to a gray value at a center position of each fiber, determined in one or more sample images; performing a spatial interpolation using the gray value at the fiber center to obtain gray values of other pixel points in the fiber bundle (04) in the reconstructed image, so as to form the reconstructed image. This image reconstruction method greatly accelerates the speed of image reconstruction, and is helpful to remove the grating (022) and fiber bundle (04) cellular grid residues in the reconstructed image and improve the imaging quality of the reconstructed image.

18 Claims, 5 Drawing Sheets

(51) Int. Cl.

| | |
|---|---|
| *G01N 21/64* | (2006.01) |
| *G02B 21/08* | (2006.01) |
| *G02B 21/16* | (2006.01) |
| *G02B 21/36* | (2006.01) |
| *G06T 5/00* | (2006.01) |
| *H04N 5/372* | (2011.01) |
| *H04N 7/18* | (2006.01) |

(52) U.S. Cl.
CPC ........... *G02B 21/16* (2013.01); *G02B 21/365* (2013.01); *G06T 5/007* (2013.01); *H04N 5/372* (2013.01); *H04N 7/18* (2013.01); *G01N 2201/0635* (2013.01); *G01N 2201/0833* (2013.01); *G06T 2207/10056* (2013.01); *G06T 2207/10064* (2013.01)

(58) Field of Classification Search
CPC . A61B 5/0068; A61B 5/0075; A61B 5/14551; A61B 5/0077; A61B 5/4331; A61B 1/043; A61B 18/00; G02B 6/06; G02B 21/0028; G02B 21/0032; G02B 21/0072; G02B 21/0056; G02B 23/26; G02B 23/2453; G01N 2021/6484; G01N 21/474; G01N 2021/6417; G01N 2021/6423; G01N 21/274; G01N 21/31; G01N 21/645; G01N 2201/0221; G01N 21/4795

See application file for complete search history.

(56) References Cited

U.S. PATENT DOCUMENTS

| | | | | |
|---|---|---|---|---|
| 8,589,104 B2* | 11/2013 | Winer | ..................... | G02B 23/26 356/73.1 |
| 2003/0089159 A1* | 5/2003 | Roe | ........................ | G01N 27/60 73/28.01 |
| 2006/0074516 A1* | 4/2006 | Huang | ................... | G01K 11/06 374/E11.006 |
| 2009/0092363 A1 | 4/2009 | Daum et al. | | |
| 2010/0214404 A1* | 8/2010 | Chen | ................... | G02B 21/0056 359/290 |
| 2015/0168702 A1 | 6/2015 | Harris | | |
| 2020/0242732 A1 | 7/2020 | Shao | | |

FOREIGN PATENT DOCUMENTS

| | | |
|---|---|---|
| CN | 1758754 A | 4/2016 |
| CN | 106447717 A | 2/2017 |
| CN | 106981090 A | 7/2017 |
| CN | 107621463 A | 1/2018 |
| EP | 3699576 A1 | 8/2020 |
| JP | 2013192063 A | 9/2013 |
| JP | 2016109579 A | 6/2016 |
| KR | 10-1260051 B1 | 5/2013 |
| WO | WO2019076192 A1 | 4/2019 |

OTHER PUBLICATIONS

"Evaluation of spatial interpolation strategies for the removal of comb-structure in fiber-optic images", 31st Annual International Conference of the IEEE EMBS Minneapolis, Minnesota, USA, Sep. 2-6, 2009.
"Snapshot spectrally did encoded fluorescence imaging through a fiber bundle", Journal of Biomedical Optics, vol. 17(8), Aug. 2012.
The EESR of EP application No. 18868288.4.
D1: "Differential structured illumination microendoscopy for in vivo imaging of molecular contrast agents", PNAS Sep. 27, 2016, vol. 113, No. 39, 10769-10773.
D2: "Fluorescence endomicroscopy with structured illumination", 2008 Optical Society of America.
The first Office Action of RU application No. 202011546728.
The first Office Action of parallel Japan application JP2020541842.
The first Office Action of parallel Korea application KR1020207013484.
"Pixelate Removal in an Image Fiber Probe Endoscope Incorporating Comb Structure Removal Methods", Journal of Medical Imaging and Health Informatics, vol. 4, 203-211, 2014.
The Chinese International Search Report of corresponding International application No. PCT/CN2018/108865, dated Dec. 29, 2018.

* cited by examiner

IMAGE RECONSTRUCTION METHOD, DEVICE AND MICROSCOPIC IMAGING DEVICE

CROSS-REFERENCE TO RELATED APPLICATIONS

This application is a continuation of International Application No. PCT/CN2018/108865, filed on Sep. 29, 2018, which claims the priority benefit of China Patent Application No. 201710959434.8, filed on Oct. 16, 2017. The contents of the above identified applications are incorporated herein by reference in their entireties.

TECHNICAL FIELD

The present disclosure relates to an image processing technology, and in particular, to an image reconstruction method, device, and microscopic imaging device.

BACKGROUND

Structured illumination-based microscopes have a sectioning imaging function of suppressing out-of-focus noise, and have the advantages of simple structure and fast imaging speed compared with confocal microscopes. In the current technology, they are often used as a conventional endoscope, and predict the occurrence and evolution of tumors in advance by scanning internal organs such as the human digestive tract and observing changes in shapes of cells, having an important guiding significance for cancer screening.

The structured illumination-based microscopes specifically, by an exciter, emit fluorescence that excites an organism's fluorescence, which then passes through a grating to form a sinusoidal light source with black and white stripes; and then, by moving ⅓ grating spacing of the grating each time, multiple images returned after scanning human cells are collected and acquired, for example, image $I_1$, image $I_2$, and image $I_3$; and then the image $I_1$, image $I_2$, and image $I_3$ are reconstructed according to the root mean square formula $I=\sqrt{(I_1-I_2)^2+(I_1-I_3)^2+(I_2-I_3)^2}$ to obtain a reconstructed image I. However, this reconstruction method needs to calculate gray levels of all pixels in the image $I_1$, image $I_2$, and image $I_3$ using the root mean square formula. Therefore, it takes a lot of calculation time, and the grating and fiber bundle cellular grids in the reconstructed image have obvious residues, and low imaging quality.

SUMMARY

In order to solve the technical problems in the prior art that the structured illumination-based microscope have a low image reconstruction efficiency, obvious residual gratings in the image, and low imaging quality, the present disclosure provides an image reconstruction method, device, and microscopic imaging device, so as to accelerate the speed of image reconstruction, remove the residual of the grating in the reconstructed image, and the improve the quality of the reconstructed image.

The present disclosure provides an image reconstruction method, including:

calculating a gray value at each fiber center in a fiber bundle in a reconstructed image according to a gray value at a center position of each fiber, determined in one or more sample images;

performing a spatial interpolation using the gray value at the each fiber center to obtain gray values of other pixel points in the fiber bundle in the reconstructed image to form the reconstructed image.

Optionally, the method further includes:

acquiring an original image of a uniform fluorescent fiber bundle; and determining a target pixel point with a pixel value higher than surrounding pixel values in the original image, and determining the target pixel point as the center position of each fiber in the fiber bundle.

Optionally, the acquiring an original image of a uniform fluorescent fiber bundle includes:

collecting a plurality of fiber bundle images spaced at a preset step size within a grating interval; and obtaining an average image of the plurality of fiber bundle images to form the original image of the uniform fluorescent fiber bundle.

Optionally, before performing the spatial interpolation, the method further includes:

determining an interpolation weight between each pixel point in the fiber bundle and the center position of each fiber according to the center position of each fiber.

Optionally, the method further includes determining the interpolation weight by using the following method:

forming a plurality of triangular structures using the center position of each fiber and center positions of adjacent fibers as vertices; and determining the interpolation weight between a pixel point in each triangle structure and the center position of each fiber according to the triangle structures.

Optionally, the method further includes acquiring the more sample images by using the following method:

according to a preset phase interval, moving N−1 times within a grating interval to obtain N sample images including an initial phase and moved by the preset phase interval with respect to the initial phase each time.

Optionally, the preset phase interval is 120 degrees; and N=3.

Optionally, after determining the gray value at the center position of each fiber in the one or more sample images, the method further includes:

performing a saturation judgment on the gray value at the center position of each fiber;

if there is a fiber whose center position has a gray value of exceeding a preset saturation threshold in the sample images, determining that the fiber exceeding the preset saturation threshold is a fiber to be corrected;

correcting the gray value at the center position of the fiber to be corrected to the preset saturation threshold in the reconstructed image, and performing the step of calculating the gray value at each fiber center in the fiber bundle in the reconstructed image according to the gray value at the center position of each fiber, determined in the sample images after correction; and if there is no fiber whose center position has a gray value of exceeding the preset saturation threshold in the sample images, performing the step of calculating the gray value at each fiber center in the fiber bundle in the reconstructed image according to the gray value at the center position of each fiber, determined in the sample images.

Optionally, the calculating a gray value at each fiber center in a fiber bundle in a reconstructed image according to a gray value at a center position of each fiber, determined in more sample images includes:

subtracting the gray value at the center position of each fiber in the more sample images from each other to obtain difference values, and taking a sum of squares of the obtained difference values and then taking a square root to obtain the gray value at each fiber center in the fiber bundle in the reconstructed image.

The present disclosure also provides an image reconstruction device, including:

a calculating module, configured to calculate a gray value at each fiber center in a fiber bundle in a reconstructed image according to a gray value at a center position of each fiber, determined in one or more sample images; and a forming module, configured to perform a spatial interpolation using the gray value at the each fiber center to obtain gray values of other pixel points in the fiber bundle in the reconstructed image, so as to form the reconstructed image.

Optional, the device further includes:

a first acquiring module, configured to acquire an original image of a uniform fluorescent fiber bundle; and a first determining module, configured to determine a target pixel point with a pixel value higher than surrounding pixel values in the original image, and determine the target pixel point as the center position of each fiber in the fiber bundle.

Optionally, the first acquiring module includes:

a collecting sub-module, configured to collect a plurality of fiber bundle images spaced at a preset step size within a grating interval; and a forming sub-module, configured to obtain an average image of the more fiber bundle images to form the original image of the uniform fluorescent fiber bundle.

Optionally, the device further includes:

a second determining module, configured to determine an interpolation weight between each pixel point in the fiber bundle and the center position of each fiber according to the center position of each fiber.

Optionally, the device further includes:

a third determining module, configured to form a plurality of triangular structures using the center position of each fiber and center positions of adjacent fibers as vertices, and determine an interpolation weight between a pixel point in each triangle structure and the center position of each fiber according to the triangle structures.

Optionally, the device further includes:

a second acquiring module, configured to move N−1 times within a grating interval according to a preset phase interval to obtain N sample images including an initial phase and moved by the preset phase interval with respect to the initial phase each time.

Optionally, the preset phase interval is 120 degrees; and N=3.

Optionally, the device further includes:

a judging module, configured to perform a saturation judgment on the gray value at the center position of each fiber;

a first processing module, configured to: when there is a fiber whose center position has a gray value of exceeding a preset saturation threshold in the sample images, determine that the fiber exceeding the preset saturation threshold is a fiber to be corrected; correct the gray value at the center position of the fiber to be corrected to the preset saturation threshold in the reconstructed image, and perform the step of calculating the gray value at each fiber center in the fiber bundle in the reconstructed image according to the gray value at the center position of each fiber, determined in the sample images after correction; and a second processing module, configured to: when there is no fiber whose center position has a gray value of exceeding the preset saturation threshold in the sample images, perform the step of calculating the gray value at each fiber center in the fiber bundle in the reconstructed image according to the gray value at the center position of each fiber, determined in the sample images.

Optionally, the calculating module is specifically configured to subtract the gray value at the center position of each fiber in the more sample images from each other to obtain difference values, and take a sum of squares of the obtained difference values and then take a square root to obtain the gray value at each fiber center in the fiber bundle in the reconstructed image.

The present disclosure also provides a microscopic imaging device, including:

a light emitting unit, a phase adjusting unit, steering unit, a fiber bundle containing a plurality of fibers, a detecting unit, and a processing unit, where:

the light emitting unit is configured to emit an excitation light;

the phase adjusting unit is provided at an exit of an optical path of the excitation light, and is connected to the processing unit, and is configured to adjust a phase of the excitation light according to a phase adjustment amount sent by the processing unit to obtain excitation lights in different phases;

the steering unit is configured to steer the excitation lights in different phases, so that the steered excitation lights are focused to a tissue to be detected along the fiber bundle and to steer fluorescence in different phases returned through the tissue to be detected;

the detecting unit is configured to collect fluorescence in different phases to form a plurality of sample images; and the processing unit is connected to the detecting unit, and is configured to receive the plurality of sample images, and calculate a gray value at each fiber center in the fiber bundle in a reconstructed image according to a gray value at a center position of each fiber in the fiber bundle determined in the plurality of sample images; perform a spatial interpolation using the gray value at the each fiber center to obtain gray values of other pixel points in the fiber bundle in the reconstructed image so as to form the reconstructed image.

Optionally, the phase adjusting unit includes: a motor and a grating;

the motor is connected to the processing unit and the grating, respectively, and is configured to drag the grating to move according to the phase adjustment amount sent by the processing unit, so that the excitation light is transmitted through the grating to obtain an excitation light corresponding to the phase adjustment amount.

Optionally, the motor includes: a direct current motor; and correspondingly, the processing unit determines an equal-interval phase adjustment amount according to a preset phase interval; the direct current motor receives the equal-interval phase adjustment amount, and drags the grating to move by an equal interval distance within a grating spacing range to enable the processing unit to obtain a plurality of sample images corresponding to the preset phase interval.

Optionally, the preset phase interval is 120 degrees; and the phase adjustment amount is 3.

Optionally, the light emitting unit includes: a laser, configured to emit the excitation light; and further includes a beam expander-focuser provided at an exit of the excitation light of the laser and is configured to expand the excitation light and one-dimensionally focus it into a line beam.

Optionally, the steering unit is a dichroic mirror.

Optionally, the device further includes: a filter; the filter is disposed between the phase adjusting unit and the steering unit, and is configured to filter out stray light.

Optionally, the detecting unit includes: a charge coupled device CCD.

Optionally, the device further includes: an objective lens including a plurality of lenses; the objective lens is disposed between the steering unit and the fiber bundle, and is configured to perform a focusing processing on the excitation light steered by the steering unit.

The image reconstruction method, device and microscopic imaging device of the present disclosure are to form a reconstructed image by calculating a gray value at each fiber center in a fiber bundle in the reconstructed image according to a gray value at a center position of each fiber, determined in one or more sample images; and performing a spatial interpolation using the gray value at the each fiber center to obtain gray values of other pixel points in the fiber bundle in the reconstructed image. This image reconstruction method only calculates a gray value of a pixel point at the fiber center, and then obtains gray values of pixel points of the entire image based on the spatial interpolation, thereby reducing the calculation amount due to calculating the gray value of each pixel point, greatly accelerating the speed of image reconstruction, and the method is helpful to remove the grating and fiber bundle cellular grid residues in the reconstructed image and improve the imaging quality of the reconstructed image.

Figure 1:
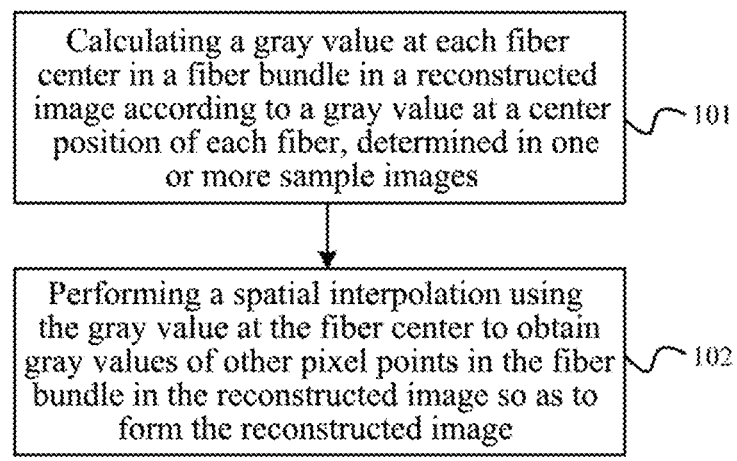
FIG. 1 is a flowchart of an image reconstruction method of the present disclosure according to an exemplary embodiment.

Reference numerals: light emitting unit 01, laser 011, beam expander-focuser 012, phase adjusting unit 02, motor 021, grating 022, steering unit 03, fiber bundle 04, detecting unit 05, processing unit 06, filter 07, objective lens 08.

DETAILED DESCRIPTION OF THE EMBODIMENTS

In order to make the objects, technical solutions, and advantages of the present disclosure more clear, technical solutions in embodiments of the present disclosure will be clearly and completely described below with reference to the accompanying drawings in the embodiments of the present disclosure. Obviously, the described embodiments are only part of embodiments of the present disclosure, not all embodiments of the present disclosure. All other embodiments obtained by those skilled in the art based on the embodiments of the present disclosure without creative efforts shall fall within the protection scope of the present disclosure.

Figure 2:
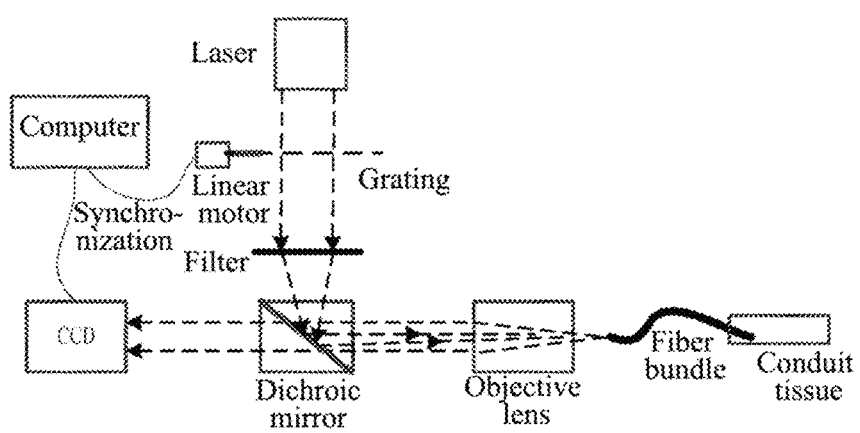
FIG. 2 is a schematic view of a structured light microendoscope device according to the embodiment shown in FIG. 1.

FIG. 1 is a flowchart of an image reconstruction method of the present disclosure according to an exemplary embodiment. As shown in FIG. 1, the image reconstruction method of the present disclosure is suitable for reconstructions of all optically imaged images, and is especially suitable for an image reconstruction based on structured light. First, in this embodiment, the principle of structured light imaging is briefly explained by taking a structured light-based endoscope as an example:

In the structured light-based microendoscope device shown in FIG. 2, a light source emitted by the exciter is modulated by a grating to produce a sinusoidal light, and the sinusoidal light passes through a dichroic mirror (that is, light with a specific frequency is transmitted and light with a non-specific frequency is reflected) and an objective lens, and excites a stained tissue (for example, a cell tissue in the human body) along the fiber bundle, and fluorescence after excitation reaches a charge-coupled device (CCD) along the fiber bundle, the objective lens and the dichroic mirror and performs an image collection. CCD, also called image sensor or image controller, is a semiconductor device that can convert an optical image into electrical signals. The modulated sinusoidal light source is focused on a certain focal plane of the tissue. By exciting fluorescence imaging in multiple phases (for example, three phases), the background fluorescence outside the focal plane are filtered out using the Neil formula, to realize a sectioning imaging. Sectioning imaging technology is a geophysical prospecting inversion interpretation method that inversely calculates obtained information according to ray scanning that uses medical CT as a reference, to reconstruct an image of a distribution law of elastic wave and electromagnetic wave parameters of a rock mass in a measured range and thereby achieve delineating geological anomaly.

The light source of the structured light modulated by the grating can be expressed as:

$$s_i(x,y)=\frac{1}{2}[1+m\cos(\tilde{v}x+\phi_i)]$$

In the above formula, m is a modulation contrast;

$$\tilde{v}=\frac{\beta\lambda v}{NA}$$

is a normalized spatial frequency, the $\tilde{v}$ value can be used to achieve sectioning of images at different depth (axial depth); $\beta$ is a magnification between a specimen plane and a grid plane, $\lambda$ is a wavelength, v is an actual spatial frequency, and NA is a numerical aperture.

In this embodiment, the pixel information transmitted from each fiber in the fiber bundle in FIG. 2 needs to be determined in order to accurately obtain the fluorescence information returned after the structured light irradiates the stained tissue, and a clear and accurate image of the information is formed. The specific implementation steps of the image reconstruction method in this embodiment includes:

Step 101: calculating a gray value at each fiber center in a fiber bundle in a reconstructed image according to a gray value at a center position of each fiber, determined in one or more sample images.

Specifically, the structured light microendoscope device shown in FIG. 2, a direct current motor is driven to move the grating to acquire one or more sample images. The sample images contain the pixel information transmitted by each fiber in the fiber bundle. For the fiber bundle, one fiber bundle is usually including nearly 30,000 fibers (the difference in the number can reach several thousand). The pixel information is transmitted in each fiber, so the fiber bundle can also be called a multi-sensor. The imaging of fibers generally shows an image in a hexagonal cellular shape, and the diameter of each fiber is preferably 5 to 6 pixels. In the more sample images, the center position of each fiber is determined, and the gray value of the pixel point at each center position is obtained. The method for determining the gray value at the center position can be obtained by using the root-mean-square formula described above, that is, a gray-value average value of the gray values at the same center position in the more sample images is obtained, and the calculated gray-value average value is used as the gray value at the fiber center in the reconstructed image, and then the gray value at each fiber center in the fiber bundle in the reconstructed image is obtained.

Step 102: performing a spatial interpolation using the gray value at the fiber center to obtain gray values of other pixel points in the fiber bundle in the reconstructed image so as to form the reconstructed image.

Specifically, the center position of each fiber is used as a reference to find a linear relationship between the other pixel points and the pixel point at the center position in each fiber, so that interpolation weights of all pixel points relative to the pixel point at the center position in each fiber can be determined, i.e., weights of the other pixel points relative to the pixel point at the center position in each fiber. Therefore, based on the interpolation weight between each pixel point and the fiber center, the spatial interpolation is performed using the gray value at the fiber center, to obtain the gray values of the other pixel points in the fiber bundle in the reconstructed image, and the reconstructed image is formed.

The image reconstruction method of this embodiment form the reconstructed image by calculating the gray value at each fiber center in the fiber bundle in the reconstructed image according to the gray value at the center position of each fiber, determined in one or more sample images; performing the spatial interpolation using the gray value at the each fiber center to obtain the gray values of other pixel points in the fiber bundle in the reconstructed image. This image reconstruction method only calculates the gray value of the pixel point at the fiber center position, and then obtains the gray values of the pixel points of the entire image based on the spatial interpolation, thereby reducing the calculation amount due to calculating the gray value of each pixel point, greatly accelerating the speed of image reconstruction, and the method is helpful to remove the grating and fiber bundle cellular grid residues in the reconstructed image and improve the imaging quality of the reconstructed image.

Figure 3:
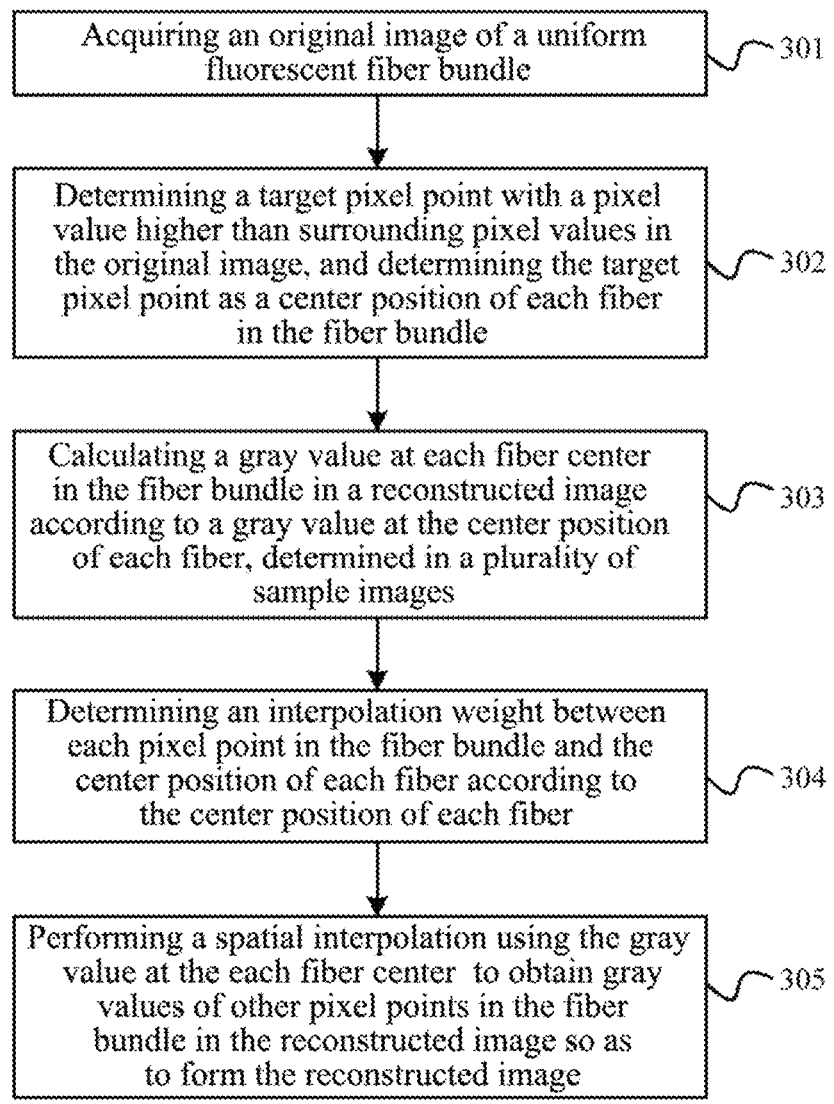
FIG. 3 is a flow chart of an image reconstruction method of the present disclosure according to another exemplary embodiment.

FIG. 3 is a flowchart of an image reconstruction method of the present disclosure according to another exemplary embodiment. As shown in FIG. 3, the image reconstruction method according to this embodiment includes:

Step 301: acquiring an original image of a uniform fluorescent fiber bundle.

Step 302: determining a target pixel point with a pixel value higher than surrounding pixel values in the original image, and determining the target pixel point as a center position of each fiber in the fiber bundle.

Specifically, before the image reconstruction, an image with uniform fluorescence may be taken, and the image with uniform fluorescence is used to accurately locate fiber. For the fiber bundle, a fiber bundle is usually including nearly 30,000 fibers (the difference in the number can reach several thousand). Pixel information is transmitted in each fiber, so the fiber bundle can also be called a multi-sensor. The imaging of fibers generally shows an image in a hexagonal cellular shape, and the diameter of each fiber is preferably 5 to 6 pixels. In order to reduce mutual interference between fibers, the fibers are arranged irregularly in space, rather than aligned in rows or columns. The fiber center position in this embodiment refers to the brightest point at the fiber center. The so-called brightest point means a target pixel point having a pixel value determined to be higher than the surrounding pixel values in the original image, and the target pixel point is determined to be the fiber center of each fiber in the fiber bundle, other pixel points in each fiber is located by using the coordinates of the brightest point at the center as coordinates of the fiber. In order to remove the grid, that is, the hexagonal cell of the fiber, the gray value at the fiber center needs to be used for spatial interpolation to obtain the gray values of other pixel points in the entire fiber bundle. Generally, after the grating is installed, the captured locating image, i.e., the original image will have the grating. Therefore, it is possible to shoot after removing the grating, to obtain an original image of a uniform fluorescent fiber bundle; optionally, a plurality of fiber bundle images spaced at a preset step size can also be collected within a grating interval; an average image of the plurality of fiber bundle images is obtained to form the original image of the uniform fluorescent fiber bundle. That is to say, the direct current motor in FIG. 2 uniformly moves several same displacements within a grating spacing range, and then the collected average image is taken. Those skilled in the art can self-determine a method for obtaining an original image of the uniform fluorescent fiber bundle, which is not specifically limited in this embodiment.

Step 303: calculating a gray value at each fiber center in the fiber bundle in the reconstructed image according to a gray value at the center position of each fiber, determined in a plurality of sample images.

Where the sample image can be obtained by moving N−1 times within a grating interval according to a preset phase interval, to obtain N sample images including an initial phase, and moving by the preset phase interval with respect to the initial phase each time. For example, a grating is installed, and the grating is dragged by a motor to move so as to obtain N sample images of the fiber bundle. For example, when starting to collect the sample images, one sample image is taken at an initial position of the motor; then the motor is moved to another position and another sample image is taken; the motor is moved again and still another image is taken, thereby obtaining N sample images. In order to ensure the accuracy of the obtained sample images, the motor can be rotated clockwise to multiple positions to obtain the above N sample images. After waiting for a period of time, the motor is moved counterclockwise to further obtain N sample images. This can reconstruct two structured light images, and the accuracy of the reconstructed image can be guaranteed by comparison. Preferably, the preset phase interval is 120 degrees, and N=3; correspondingly, the motor drags the grating to move horizontally, and the preset phase interval threshold for each move is ⅓ of the grating spacing. Before collecting, the camera captures an image at the initial position where the motor moves, then the motor moves, the camera captures another image, the motor further moves, and the camera captures still another image, thereby obtaining sample images in three phases, then an image is reconstructed; then, for keeping a consistent period, wait for a period of time; continue to perform capturing in an opposite movement direction . . . in this way, two structured light images can be reconstructed after the motor moves back and forth once. The three sample images can be 0-degree phase sample image $I_1$ (initial phase), 120-degree phase sample image $I_2$ (moving by one preset phase interval threshold), and 240-degree phase sample image $I_3$ (moving by two preset phase interval thresholds). In the three phase sample images, according to positions of the fiber centers, gray values at the fiber centers of the three phase sample images are retrieved, then a gray value $G_1$ of the fiber center of the 0-degree phase sample image $I_1$, a gray value $G_2$ of the fiber center of the 120-degree phase sample image $I_2$, and a gray value $G_3$ of the fiber center of the 240-degree phase sample image $I_3$ are obtained. Optionally, calculation of a gray value at each fiber center in the fiber bundle in the reconstructed image can be realized by subtracting the gray value at a center position of each fiber in plurality of sample images from each other to obtain difference values, and taking a sum of squares of the obtained difference values and then taking a square root to obtain the gray value at each fiber center in the fiber bundle in the reconstructed image. For example, based on the Neil formula $G=\sqrt{(G_1-G_2)^2+(G_1-G_3)^2+(G_2-G_3)^2}$, differences between three center gray values in the three sample images are taken, and then the difference values are squared, and the squared differences are added and then a square root is taken, thereby the gray value at the each fiber center in the reconstructed image is obtained.

However, for the above Neil formula, the disadvantage lies in that when the sample images are oversaturated, the center gray values being subtracted from each other will cause the calculated gray value at the center point to be a black point with a very small gray level. This will result in a black area in the reconstructed image, making it impossible to image the cells clearly. In order to avoid the problem of unclear imaging caused by image saturation, a saturation correction can be applied to the gray value at the fiber center point. In this way, the reconstructed image can have a good sectioning effect.

Optionally, after determining the gray value at the center position of each fiber in one or more sample images, a step of performing saturation judgment on the gray value at the center position of each fiber may be added. That is, if there is a fiber whose central position has a gray value exceeding a preset saturation threshold in the sample images, determining that the fiber exceeding the preset saturation threshold is a fiber to be corrected; correcting the gray value at the center position of the fiber to be corrected to the preset saturation threshold in the reconstructed image, and according to the gray value at the center position of each fiber, determined in the sample images after correction, performing the step of calculating the gray value at each fiber center in the fiber bundle in the reconstructed image;

If there is no fiber whose center position has a gray value of exceeding the preset saturation threshold in the sample images, performing the step of calculating a gray value at each fiber center in the fiber bundle in the reconstructed image according to the gray value at the center position of each fiber, determined in the sample images.

The preset saturation threshold can be determined according to the performance of the CCD. For example, whether the three gray values, the gray value $G_1$ of the fiber center of the 0-degree phase sample image $I_1$, the gray value $G_2$ of the fiber center of the 120-degree phase sample image $I_2$, and the gray value $G_3$ of the fiber center of the 240-degree phase sample image $I_3$, are greater than 4095 (4095 corresponds to a maximum value of a 12-bit image, meaning that the CCD is saturated) is determined, and then instead of using the above Neil formula $G=\sqrt{(G_1-G_2)^2+(G_1-G_3)^2+(G_2-G_3)^2}$ to calculate the gray value at the center point in the reconstructed image, the preset saturation threshold of 4095 is directly used as the gray value at the center point. This processing avoids a phenomenon that black and white in the sample images and the reconstructed structured light image are visually opposite. However, this processing is a last resort remedy. For those skilled in the art, the problem of image saturation when collecting sample images should be avoided as far as possible. For example, measures, such as avoiding excessively long exposure times and excessive gain of camera parameters, avoiding too much fluorescent staining on a sample, and avoiding excessively strong laser light emitted by the laser, may be adopted.

Similarly, if there is a fiber whose central position has a gray value of exceeding a preset saturation threshold in the sample images, it is determined that the fiber that exceeds the preset saturation threshold is a fiber to be corrected; the gray value at the center position of the fiber to be corrected is corrected to the preset saturation threshold in the reconstructed image. That is to say, if a calculated value of $G=\sqrt{(G_1-G_2)^2+(G_1-G_3)^2+(G_2-G_3)^2}$ exceeds the preset saturation threshold, the fiber is determined as the fiber to be corrected, and the preset saturation threshold is also used as the gray value at the center position of the fiber, thereby achieving saturation correction of the sample image.

Step 304: determining an interpolation weight between each pixel point in the fiber bundle and the center position of each fiber according to the center position of each fiber.

Specifically, as described above, both a sample image and an original image are optical imaging of a fiber bundle of the same structure. Therefore, according to the center position of each fiber, determined in the original image, a center position of a corresponding fiber in the sample image can be found, and the gray value at this center point can be read. Each fiber in N sample images is located and its gray value is obtained. Therefore, each fiber corresponds to gray values at N center positions. Based on a preset algorithm (such as the Neil formula of root mean square, as described above), gray-value average value of the gray values at the N center positions is obtained, and the calculated gray-value average value is used as the gray value at the fiber center in the reconstructed image For the interpolation weight between each pixel point in the fiber bundle and the center position of each fiber, it can be determined by forming a plurality of triangular structures using the center position of each fiber and center positions of adjacent fibers as vertices; and determining an interpolation weight between a pixel point in each triangle structure and the center position of the each fiber according to the triangle structure.

Figure 4:
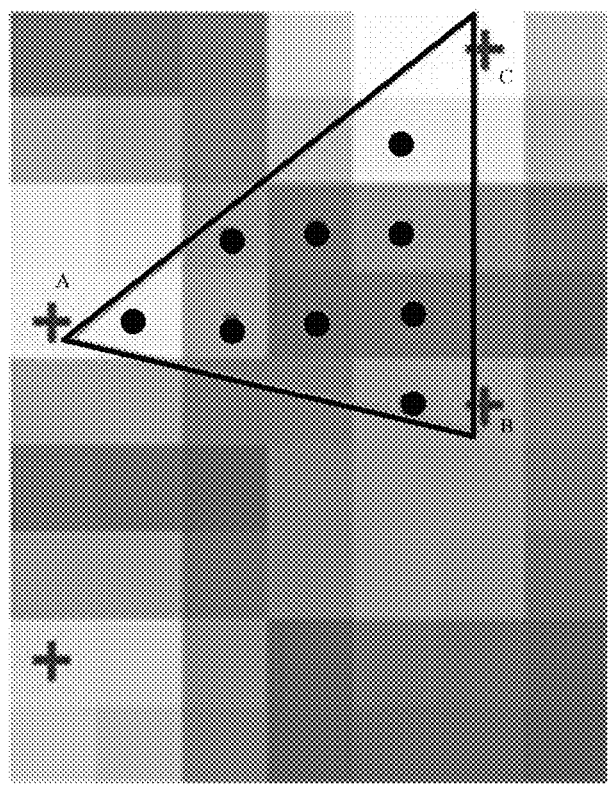
FIG. 4 is a schematic diagram of a triangular structure of a fiber pixel according to the embodiment shown in FIG. 3.

Specifically, fiber center coordinates can be obtained according to a regional maximum method, that is, as shown in FIG. 4, a center position of a fiber A is used as a vertex, and three center positions of the fiber A and adjacent fibers B and C form a triangle, so that a range of the entire fiber bundle is divided into multiple triangles. The interpolation relationship between pixels and fibers is established through these triangles. Because the fiber bundle is roughly hexagonal with an irregular distribution, and adjacent fibers do not have an alignment relationship in horizontal or vertical coordinates, an intermediate pixel cannot be interpolated by four regular vertices, like a conventional bilinear interpolation. However, using this triangular structure, the interpolation weight between the pixel point in each triangular structure and the center position of each fiber can also be determined.

Step 305: performing a spatial interpolation using the gray value at the each fiber center to obtain gray values of other pixel points in the fiber bundle in the reconstructed image so as to form the reconstructed image.

Specifically, after acquiring the original image of the uniform fluorescent fiber bundle, center positions of all fibers contained in the fiber bundle are determined in the original image, that is, position coordinates of a brightest pixel point in each fiber. The center position of each fiber is used as a reference to find a linear relationship between other pixel points in each fiber and the pixel point at the center position, so that interpolation weights of all pixel points in each fiber relative to the pixel point at the center position are determined, i.e., weights of other pixel points in each fiber relative to the pixel point at the center position. Subsequent reconstruction of the sample images obtained by irradiating a tissue with a structured light can be based on linear weights calculated in advance and multiplied by the gray values of the fibers during reconstruction to obtain the gray values of the pixels to be interpolated to form a reconstructed image.

The image reconstruction method of this embodiment obtains reconstruction of structured light imaging by using fiber positioning in triangle-based pixel space, where only the pixels of the center points of the fibers are calculated by using the Neil formula, and then the entire structured light image is reconstructed by interpolation. The calculation time is greatly saved, and the cellular structure of the fibers can be removed. When phase differences between N sample images, for example, three sample images, are exactly 120 degrees, traces of the grating are also absent. Therefore, the image reconstruction method of the present disclosure can greatly reduce the calculation amount due to calculating the gray value of each pixel point, greatly accelerate the speed of image reconstruction, and also the method is helpful to remove the grating and fiber bundle cellular grid residues in the reconstructed image and improve the imaging quality of the reconstructed image.

Figure 5:
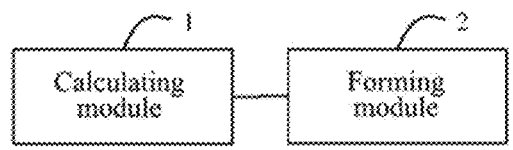
FIG. 5 is a schematic structural diagram of an image reconstruction device of the present disclosure according to an exemplary embodiment.

FIG. 5 is a schematic structural diagram of an image reconstruction device of the present disclosure according to an exemplary embodiment. As shown in FIG. 5, the image reconstruction device according to this embodiment includes:

a calculating module 1, configured to calculate a gray value at each fiber center in a fiber bundle in a reconstructed image according to a gray value at a center position of each fiber, determined in one or more sample images;

a forming module 2, configured to perform a spatial interpolation using the gray value at the each fiber center to obtain gray values of other pixel points in the fiber bundle in the reconstructed image to form the reconstructed image.

This embodiment may be used to implement the embodiment shown in FIG. 1, and implementation principles of the two embodiments are similar, and details are not described herein again.

In the image reconstruction device of this embodiment, the reconstructed image is formed by calculating a gray value at each fiber center in a fiber bundle in a reconstructed image according to a gray value at a center position of each fiber, determined in a plurality of sample images; performing a spatial interpolation using the gray value at the each fiber center to obtain gray values of other pixel points in the fiber bundle in the reconstructed image. This image reconstruction method only calculates gray values of pixel points of center positions of fibers, and then obtains gray value of pixel points of the entire image based on a spatial interpolation, thereby reducing the calculation amount due to calculating the gray value of each pixel point, greatly accelerating the speed of image reconstruction, and the method is helpful to remove the grating and fiber bundle cellular grid residues in the reconstructed image and improve the imaging quality of the reconstructed image.

Figure 6:
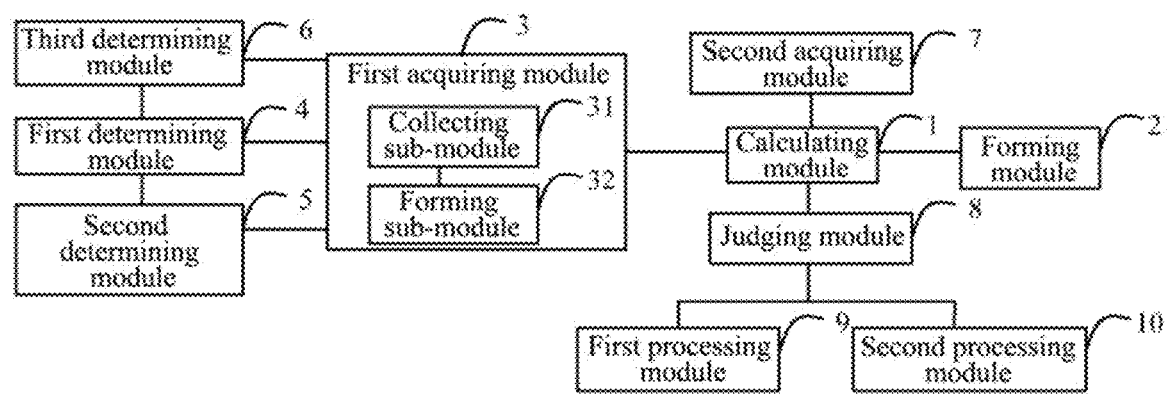
FIG. 6 is a schematic structural diagram of an image reconstruction device of the present disclosure according to another exemplary embodiment.

FIG. 6 is a schematic structural diagram of an image reconstruction device of the present disclosure according to another exemplary embodiment. As shown in FIG. 6, based on the above embodiment, the image reconstruction device in this embodiment further includes:

a first acquiring module 3, configured to acquire an original image of a uniform fluorescent fiber bundle;

a first determining module 4, configured to determine a target pixel point with a pixel value higher than surrounding pixel values in the original image, and determining the target pixel point to be the center position of each fiber in the fiber bundle.

Optionally, the first acquiring module 3 includes:

a collecting sub-module 31, configured to collect a plurality of fiber bundle images spaced at a preset step size within a grating interval;

a forming sub-module 32, configured to obtain an average image of the plurality of fiber bundle images to form an original image of the uniform fluorescent fiber bundle.

Optionally, the device further includes:

a second determining module 5, configured to determine an interpolation weight between each pixel point in the fiber bundle and the center position of each fiber according to the center position of each fiber.

Optionally, the device further includes:

a third determining module 6, configured to form a plurality of triangular structures using the center position of each fiber and center positions of adjacent fibers as vertices, and determine an interpolation weight between a pixel in each triangle structure and the center position of each fiber according to the triangle structures.

Optionally, the device further includes:

a second acquiring module 7, configured to move N−1 times within a grating interval according to a preset phase interval to obtain N sample images including an initial phase, and moving by the preset phase interval with respect to the initial phase each time.

Optionally, the preset phase interval is 120 degrees; and N=3.

Optionally, the device further includes:

a judging module 8, configured to perform a saturation judgment on the gray value at the center position of each fiber;

a first processing module 9, configured to: when there is a fiber whose central position has a gray value of exceeding a preset saturation threshold in the sample images, determine that the fiber exceeding the preset saturation threshold is a fiber to be corrected; correct the gray value at the center position of the fiber to be corrected to the preset saturation threshold in the reconstructed image, and according to the gray value at the center position of each fiber, determined in the sample images after correction, perform the step of calculating the gray value at each fiber center in the fiber bundle in the reconstructed image; and a second processing module 10, configured to: when there is no fiber whose center position has a gray value of exceeding the preset saturation threshold in the sample images, perform the step of calculating the gray value at each fiber center in the fiber bundle in the reconstructed image according to the gray value at the center position of each fiber, determined in the sample images.

Optionally, the calculating module 1 is specifically configured to subtract the gray value at a center position of each fiber in a plurality of sample images from each other to obtain difference values, and take a sum of squares of the obtained difference values and then take a square root to obtain the gray value at each fiber center in the fiber bundle in the reconstructed image.

This embodiment can be used to implement the embodiment shown in FIG. 3, and the implementation principles of the two embodiments are similar, and details are not described herein again.

Figure 7:
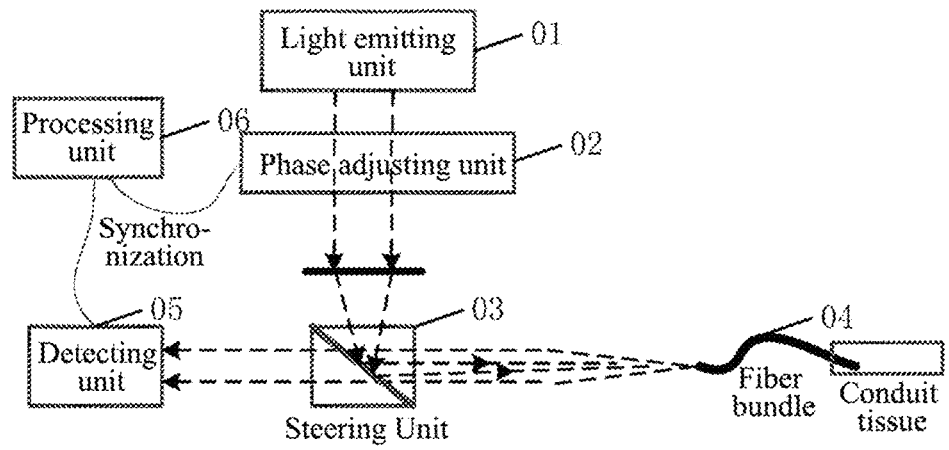
FIG. 7 is a schematic structural diagram of a microscopic imaging device of the present disclosure according to an exemplary embodiment.

FIG. 7 is a schematic structural diagram of a microscopic imaging device of the present disclosure according to an exemplary embodiment. As shown in FIG. 7, this embodiment provides a microscopic imaging device including a light emitting unit 01, a phase adjusting unit 02, a steering Unit 03, a fiber bundle 04 containing a plurality of fibers, a detecting unit 05, and a processing unit 06, where:

the light emitting unit 01 is configured to emit an excitation light;

the phase adjusting unit 02 is provided at an exit of an optical path of the excitation light, and is connected to the processing unit 06, and is configured to adjust the phase of the excitation light according to a phase adjustment amount sent by the processing unit 06 to obtain excitation lights in different phases;

the steering unit 03 is configured to steer the excitation lights in different phases, so that the steered excitation lights are focused to a tissue to be detected along the fiber bundle 04; and to steer fluorescence in different phases returned through the tissue to be detected;

the detecting unit 05 is configured to collect fluorescence in different phases to form a plurality of sample images; and the processing unit 06 is connected to the detecting unit 05, and is configured to receive the plurality of sample images, and calculate a gray value at each fiber center in the fiber bundle in the reconstructed image according to a gray value at a center position of each fiber in the fiber bundle determined in the plurality of sample images; perform a spatial interpolation using the gray value at the each fiber center to obtain gray values of other pixel points in the fiber bundle in the reconstructed image to form the reconstructed image.

Specifically, the excitation light emitted by the light emitting unit 01 passes through the steering unit 03 (that is, light with a specific frequency is transmitted and light with a non-specific frequency is reflected), and excites a stained tissue (for example, a cell tissue in the human body) along the fiber bundle 04, the fluorescence after excitation reaches the detecting unit 05 along the fiber bundle and the steering unit 03, and performs an image collection. The detecting unit 05 may be a charge-coupled device (CCD), also called image sensor or image controller, and it is a semiconductor device that can convert an optical image into electrical signals. The excitation light emitted by the light emitting unit 01 is focused on a certain focal plane of the tissue, and the phase adjusting unit 02 adjusts the phase of the excitation light according to the phase adjustment amount sent by the processing unit 06 to obtain excitation lights in different phases; the processing unit 06 excites fluorescence for imaging in multiple phases (for example, three phases), the Neil formula is used to filter out the background fluorescence outside the focal plane to realize the sectioning imaging. The sectioning imaging technology is a geophysical prospecting inversion interpretation method that inversely calculates obtained information according to ray scanning that uses medical CT as a reference, to reconstruct an image of a distribution law of elastic wave and electromagnetic wave parameters of a rock mass in a measured range and thereby achieve delineating geological anomaly. Specifically, the processing unit 06 calculates a gray value at each fiber center in the fiber bundle in the reconstructed image according to a gray value at a center position of each fiber in the fiber bundle determined in a plurality of sample images in multiple phases; perform a spatial interpolation using the gray value at the each fiber center to obtain gray values of other pixel points in the fiber bundle in the reconstructed image, forming the reconstructed image.

The microscopic imaging device of this embodiment includes a light emitting unit, a phase adjusting unit, a steering unit, a fiber bundle including a plurality of fibers, a detecting unit, and a processing unit, where the light emitting unit is configured to emit an excitation light; the phase adjusting unit is provided at an exit of an optical path of the excitation light, and is connected to the processing unit, and is configured to adjust the phase of the excitation light according to a phase adjustment amount sent by the processing unit to obtain excitation lights in different phases; the steering unit is configured to steer the excitation lights in different phases, so that the steered excitation lights are focused to a tissue to be detected along the fiber bundle; and to steer fluorescence in different phases returned through the tissue to be detected; the detecting unit is configured to collect fluorescence in different phases to form a plurality of sample images; the processing unit is connected to the detecting unit, and is configured to receive the plurality of sample images, and calculate a gray value at each fiber center in the fiber bundle in the reconstructed image according to a gray value at a center position of each fiber the fiber bundle determined in the plurality of sample images; perform a spatial interpolation using the gray value at the fiber center to obtain gray values of other pixel points in the fiber bundle in the reconstructed image to form the reconstructed image. The phase adjusting unit adjusts the phase of the excitation light according to the phase adjustment amount sent by the processing unit, so that the processing unit can obtain multiple sample images in required phases. Therefore the imaging quality of the reconstructed image obtained after processing the multiple sample images can be improved. Further, use of the device can reduce calculation amount for the gray values of pixel points in the reconstructed image, increasing the rate of image reconstruction.

Figure 8:
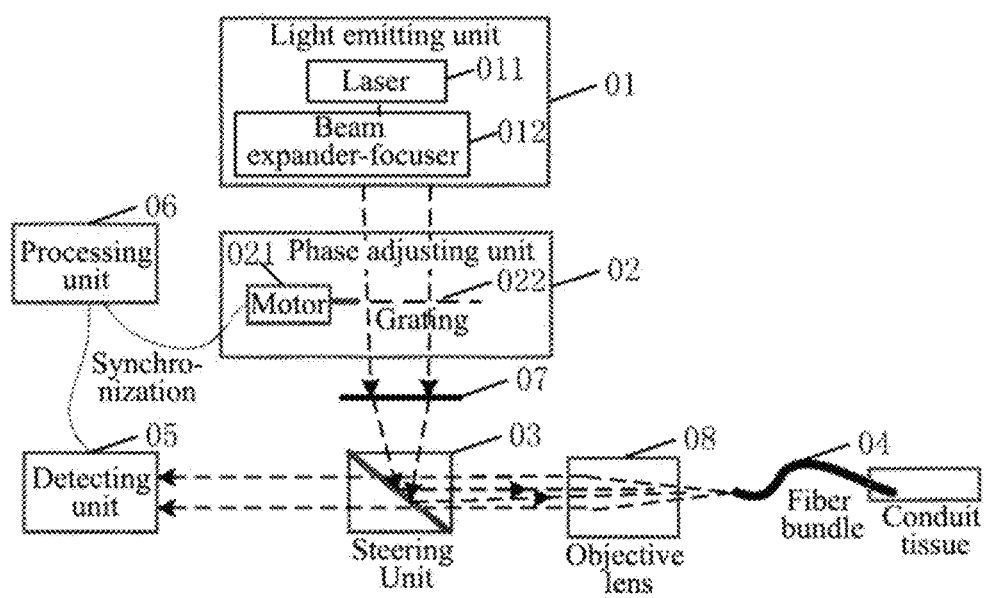
FIG. 8 is a schematic structural diagram of a microscopic imaging device of the present disclosure according to another exemplary embodiment.

FIG. 8 is a schematic structural diagram of a microscopic imaging device of the present disclosure according to another exemplary embodiment. As shown in FIG. 8, based on the above embodiment, the phase adjusting unit 02 includes: a motor 021 and a grating 022;

the motor 021 is connected to the processing unit 06 and the grating 022, respectively, and is configured to drag the grating 022 to move according to the phase adjustment amount sent by the processing unit 06, so that the excitation light is transmitted through the grating 022 to obtain an excitation light corresponding to the phase adjustment amount.

Optionally, the motor 021 includes: a direct current motor; the processing unit 06 determines an equal-interval phase adjustment amount according to a preset phase interval; a direct current motor receives the equal-interval phase adjustment amount, and drags the grating 022 to move by an equal interval distance within a grating spacing range to enable the processing unit 06 to obtain a plurality of sample images corresponding to the preset phase interval.

Specifically, the processing unit 06 drives the direct current motor to drag the grating 022 to move, so as to acquire a plurality of sample images. The sample images contain pixel information transmitted by each fiber in the fiber bundle 04. For the fiber bundle 04, a fiber bundle 04 is usually including nearly 30,000 fibers (the difference in the number can reach several thousand). The pixel information is transmitted in each fiber, so the fiber bundle 04 can also be called a multi-sensor. A schematic diagram of the fiber imaging is shown in FIG. 4. The fiber imaging generally shows an image in a hexagonal cellular shape, and the diameter of each fiber is preferably 5 to 6 pixels. In the plurality of sample images, the center position of each fiber is determined, and a gray value of a pixel point at each center position is obtained. A method for determining a gray value at a center position can be using the root-mean-square formula, that is, a gray-value average value of the gray values at the same center position in a plurality of sample images is obtained, and the calculated gray-value average value is used as the gray value at this fiber center in the reconstructed image, and then the gray value at each fiber center in the fiber bundle 04 in the reconstructed image is obtained.

Optionally, the preset phase interval is 120 degrees; and the phase adjustment amount is 3.

For example, a grating 022 is installed, and the grating 022 is dragged by a motor 021 to move so as to obtain N sample images of the fiber bundle. For example, before starting to collect the sample images, one sample image is taken at an initial position of the motor 021; then the motor 021 is moved to another position and another sample image is taken; the motor 021 is moved again and still another image is taken, thereby obtaining N sample images. In order to ensure the accuracy of the obtained sample images, the motor 021 can be rotated clockwise to multiple positions to obtain the above N sample images. After waiting for a period of time, the motor 021 is moved counterclockwise to further obtain N sample images. This can reconstruct two structured light images, and the accuracy of the reconstructed image can be guaranteed by comparison. In the case where the preset phase interval is 120 degrees, and the phase adjustment amount is 3 (i.e. N=3), the motor 021 drags the grating to move horizontally, and the preset phase interval threshold for each move is ⅓ of the grating spacing 022. Before collecting, the camera captures an image at the initial position where the motor 021 moves, then the motor 021 moves, the camera captures another image, the motor 021 further moves, and the camera captures still another image, thereby obtaining sample images in three phases, then an image is reconstructed; then, for keeping a consistent period, wait for a period of time; continue to perform capturing in an opposite movement direction . . . in this way, two structured light images can be reconstructed after the motor 21 moves back and forth once. The three sample images can be 0-degree phase sample image $I_1$ (initial phase), 120-degree phase sample image $I_2$ (moving by one preset phase interval threshold), and 240-degree phase sample image $I_3$ (moving by two preset phase interval thresholds). In the three phase sample images, according to positions of the fiber centers, the gray values at the fiber centers of the three phase sample images are retrieved, then a gray value $G_1$ of the fiber center of the 0-degree phase sample image $I_1$, a gray value $G_2$ of the fiber center of the 120-degree phase sample image $I_2$, and a gray value $G_3$ of the fiber center of the 240-degree phase sample image $I_3$ are obtained.

Optionally, the light emitting unit 01 includes: a laser 011, configured to emit an excitation light; and further includes a beam expander-focuser 012, provided at an exit of the excitation light of the laser 011 and is configured to expand the excitation light and one-dimensionally focus it into a line beam.

The laser 011 is configured to emit the excitation light. It may be a laser for emitting collimated laser light with a specific wavelength. The specific wavelength may be in the range of 20 nm-2000 nm. Laser light in this wavelength range can excite a wide range of fluorophores. The laser 011 may be a quantum well laser, a solid-state laser, a gas laser (such as an argon ion laser), or a laser diode. The beam expander-focuser 012 is provided at the exit of the excitation light of the laser 011, and is configured to expand the excitation light and one-dimensionally focus it into a line beam. It may include a beam expanding lens and a cylindrical lens. The beam expanding lens is configured to expand the collimated beam emitted from the laser 011 to change a diameter of the collimated beam; and the cylindrical lens one-dimensionally focuses the expanded beam into a linear beam and transmits it to the steering unit 03.

Optionally, the steering unit 03 is a dichroic mirror or a dichroscope. It can have a wavelength range of 40 nm-2200 nm, and can realize transmission of a light at a specific frequency and reflection of a light at a non-specific frequency.

Optionally, the device further includes: a filter 07; the filter 07 is disposed between the phase adjusting unit 02 and the steering unit 03, and is configured to filter out stray light to improve the imaging quality of the sample images and then improve the imaging quality of the reconstructed image.

Optionally, the detecting unit 05 includes: a charge coupled device CCD. The detecting unit 05 may be a linear array detecting unit or a planar array detecting unit. For example, a CCD (Charge Coupled device) linear array camera or a CMOS (Complementary Metal Oxide Semiconductor) linear array camera, etc. The imaging speed of the linear array detecting unit is in the range of tens of frames to tens of millions of frames.

Optionally, the device further includes: an objective lens 08 including a plurality of lenses; the objective lens 08 is disposed between the steering unit 03 and the fiber bundle 04 and is configured to perform focusing process on the excitation light steered by the steering unit 03.

The microscopic imaging device can be used to implement the image reconstruction method in any one of the method embodiments shown in FIG. 1 and FIG. 3, and the implementation principles of them are similar, and details are not described herein again.

Those of ordinary skilled in the art will appreciate that all or part of the steps of implementing various method embodiments described above may be accomplished by hardware associated with program instructions. The aforementioned program may be stored in a computer readable storage medium. The program, when executed, performs the steps included in the foregoing method embodiments; and the foregoing storage medium includes various medium that can store program codes, such as a ROM, a RAM, a magnetic disk, or a compact disk.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently substituted; and these modifications or substitutions do not make the corresponding technical solutions deviate from the scope of the technical solutions of the embodiments of the present disclosure.

What is claimed is:

1. An image reconstruction method, comprising:
calculating a gray value at each fiber center in a fiber bundle in a reconstructed image according to a gray value at a center position of each fiber, determined in one or more sample images;
determining an interpolation weight between each pixel point in the fiber bundle and the center position of each fiber according to the center position of each fiber; and
performing a spatial interpolation using the gray value at the each fiber center to obtain gray values of other pixel points in the fiber bundle in the reconstructed image to form the reconstructed image;
wherein the determining the interpolation weight comprises:
forming a plurality of triangular structures using the center position of each fiber and center positions of adjacent fibers as vertices; and
determining the interpolation weight between a pixel point in each triangle structure and the center position of each fiber according to the triangle structures.

2. The method according to claim 1, further comprising:
acquiring an original image of a uniform fluorescent fiber bundle; and
determining a target pixel point with a pixel value higher than surrounding pixel values in the original image, and determining the target pixel point as the center position of each fiber in the fiber bundle.

3. The method according to claim 2, wherein the acquiring an original image of a uniform fluorescent fiber bundle comprises:
collecting a plurality of fiber bundle images spaced at a preset step size within a grating interval; and
obtaining an average image of the plurality of fiber bundle images to form the original image of the uniform fluorescent fiber bundle.

4. The method according to claim 1, further comprising acquiring the more sample images by using the following methods:
according to a preset phase interval, moving N-1 times within a grating interval to obtain N sample images comprising an initial phase and moved by the preset phase interval with respect to the initial phase each time.

5. The method according to claim 4, wherein:
the preset phase interval is 120 degrees; and
N=3.

6. The method according to claim 1, wherein after determining the gray value at the center position of each fiber in the one or more sample images, the method further comprises:
performing a saturation judgment on the gray value at the center position of each fiber;
if there is a fiber whose center position has a gray value of exceeding a preset saturation threshold in the sample images, determining that the fiber exceeding the preset saturation threshold is a fiber to be corrected;
correcting the gray value at the center position of the fiber to be corrected to the preset saturation threshold in the reconstructed image, and performing the step of calculating the gray value at each fiber center in the fiber bundle in the reconstructed image according to the gray value at the center position of each fiber, determined in the sample images after correction; and
if there is no fiber whose center position has a gray value of exceeding the preset saturation threshold in the sample images, performing the step of calculating the gray value at each fiber center in the fiber bundle in the reconstructed image according to the gray value at the center position of each fiber, determined in the sample images.

7. The method according to claim 1, wherein the calculating a gray value at each fiber center in a fiber bundle in a reconstructed image according to a gray value at a center position of each fiber, determined in more sample images, comprising:
subtracting the gray value at the center position of each fiber in the more sample images from each other to obtain difference values, and taking a sum of squares of the obtained difference values and then taking a square root to obtain the gray value at each fiber center in the fiber bundle in the reconstructed image.

8. An image reconstruction device, comprising a processor and a computer-readable medium for storing program codes, which, when executed by the processor, cause the processor to:
calculate a gray value at each fiber center in a fiber bundle in a reconstructed image according to a gray value at a center position of each fiber, determined in one or more sample images;
determine an interpolation weight between each pixel point in the fiber bundle and the center position of each fiber according to the center position of each fiber, and
perform a spatial interpolation using the gray value at the each fiber center to obtain gray values of other pixel points in the fiber bundle in the reconstructed image, so as to form the reconstructed image;
wherein the program codes, when executed by the processor, further cause the processor to:
form a plurality of triangular structures using the center position of each fiber and center positions of adjacent fibers as vertices; and
determine the interpolation weight between a pixel point in each triangle structure and the center position of each fiber according to the triangle structures.

9. The device according to claim 8, wherein the program codes further cause the processor to:
acquire an original image of a uniform fluorescent fiber bundle; and
determine a target pixel point with a pixel value higher than surrounding pixel values in the original image, and determine the target pixel point as the center position of each fiber in the fiber bundle.

10. A microscopic imaging device, comprising: a light emitter, a phase adjuster, a steering, a fiber bundle comprising a plurality of fibers, a detector, and a processor, wherein,
the light emitter is configured to emit an excitation light;
the phase adjuster is provided at an exit of an optical path of the excitation light, and is connected to the processor, and is configured to adjust a phase of the excitation light according to a phase adjustment amount sent by the processor to obtain excitation lights in different phases;
the steering is configured to steer the excitation lights in different phases, so that the steered excitation lights are focused to a tissue to be detected along the fiber bundle and to steer fluorescence in different phases returned through the tissue to be detected;

the detector is configured to collect fluorescence in different phases to form a plurality of sample images; and the processor is connected to the detector, and is configured to receive the plurality of sample images, and calculate a gray value at each fiber center in the fiber bundle in a reconstructed image according to a gray value at a center position of each fiber in the fiber bundle determined in the plurality of sample images; perform a spatial interpolation using the gray value at the each fiber center to obtain gray values of other pixel points in the fiber bundle in the reconstructed image so as to form the reconstructed image.

11. The device according to claim 10, wherein the phase adjuster comprises: a motor and a grating;

the motor is connected to the processor and the grating, respectively, and is configured to drag the grating to move according to the phase adjustment amount sent by the processor, so that the excitation light is transmitted through the grating to obtain an excitation light corresponding to the phase adjustment amount.

12. The device according to claim 11, wherein the motor comprises: a direct current motor; and correspondingly, the processor determines an equal-interval phase adjustment amount according to a preset phase interval; the direct current motor receives the equal-interval phase adjustment amount, and drags the grating to move by an equal interval distance within a grating spacing range to enable the processor to obtain a plurality of sample images corresponding to the preset phase interval.

13. The device according to claim 12, wherein, the preset phase interval is 120 degrees; the phase adjustment amount is 3.

14. The device according to claim 10, wherein the light emitter comprises: a laser, configured to emit the excitation light; and further comprises a beam expander-focuser provided at an exit of the excitation light of the laser and is configured to expand the excitation light and one-dimensionally focus it into a line beam.

15. The device according to claim 10, wherein the steering is a dichroic mirror.

16. The device according to claim 10, further comprising: a filter; the filter is disposed between the phase adjuster and the steering, and is configured to filter out stray light.

17. The device according to claim 10, wherein the detector comprises: a charge coupled device CCD.

18. The device according to claim 10, further comprising: an objective lens comprising a plurality of lenses; the objective lens is disposed between the steering and the fiber bundle, and is configured to perform a focusing processing on the excitation light steered by the steering.

* * * * *